Dec. 31, 1929.					J. R. PEIRCE					1,741,201
							ACCOUNTING MACHINE
							Filed Nov. 10, 1923			13 Sheets-Sheet 1

Inventor
John Royden Peirce
By his Attorneys
Cooper, Kerr & Dunham

Dec. 31, 1929.  J. R. PEIRCE  1,741,201
ACCOUNTING MACHINE
Filed Nov. 10, 1923  13 Sheets-Sheet 2

Dec. 31, 1929.  J. R. PEIRCE  1,741,201
ACCOUNTING MACHINE
Filed Nov. 10, 1923  13 Sheets-Sheet 3

Inventor
John Royden Peirce
By his Attorneys
Cooper, Kerr + Dunham

Dec. 31, 1929.　　　J. R. PEIRCE　　　1,741,201
ACCOUNTING MACHINE
Filed Nov. 10, 1923　　13 Sheets-Sheet 4

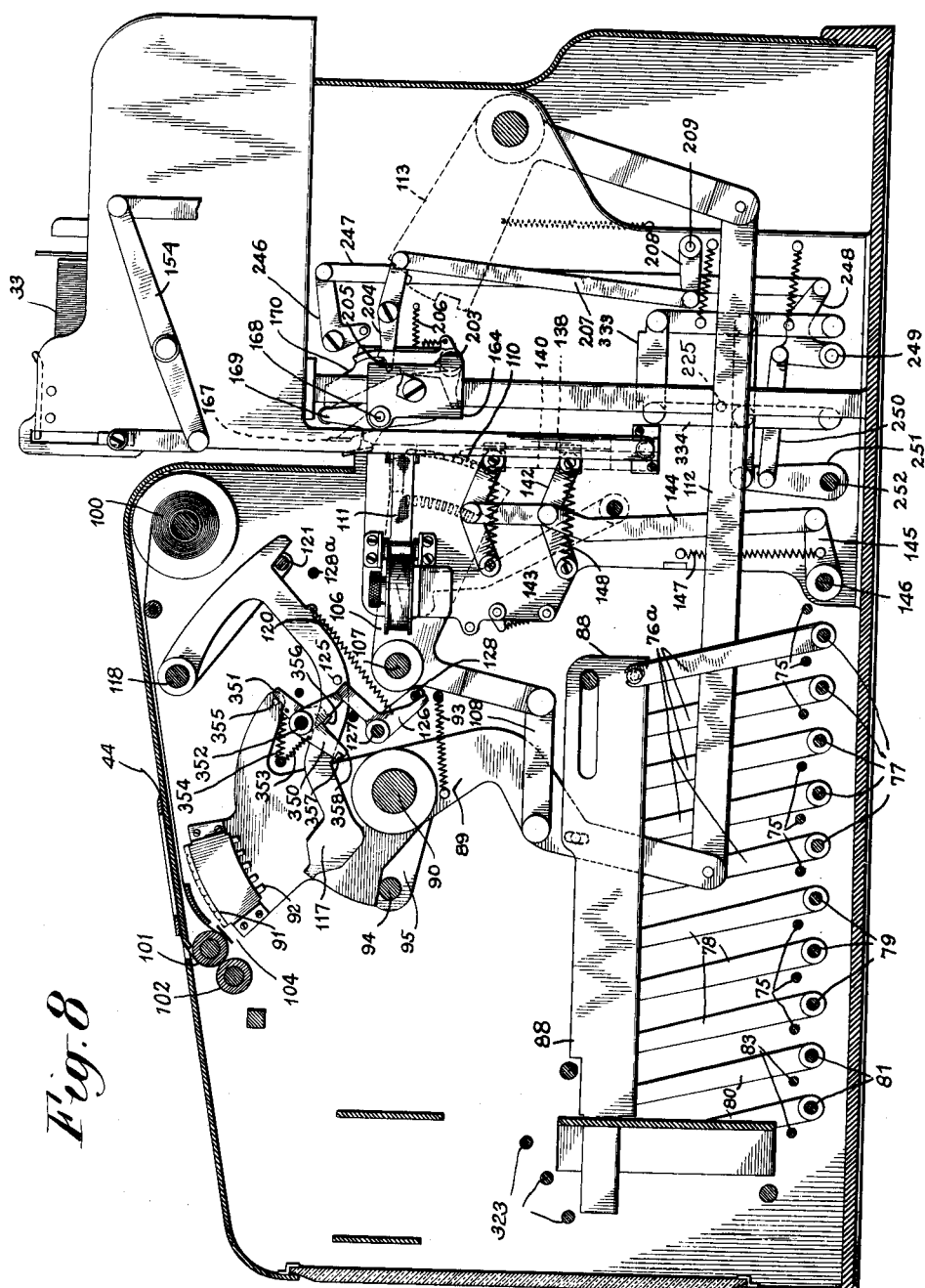

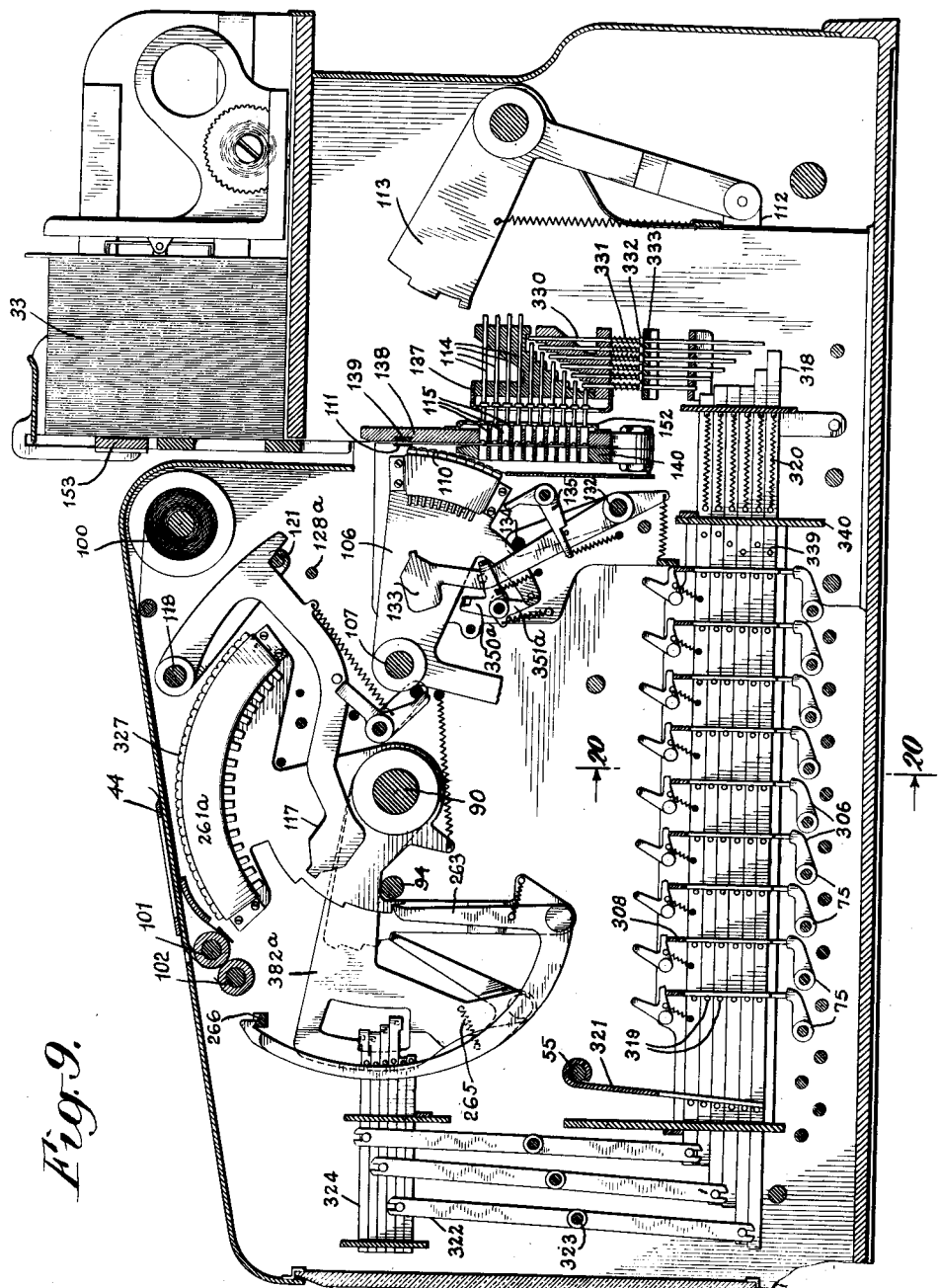

Dec. 31, 1929.  J. R. PEIRCE  1,741,201
ACCOUNTING MACHINE
Filed Nov. 10, 1923   13 Sheets-Sheet 7
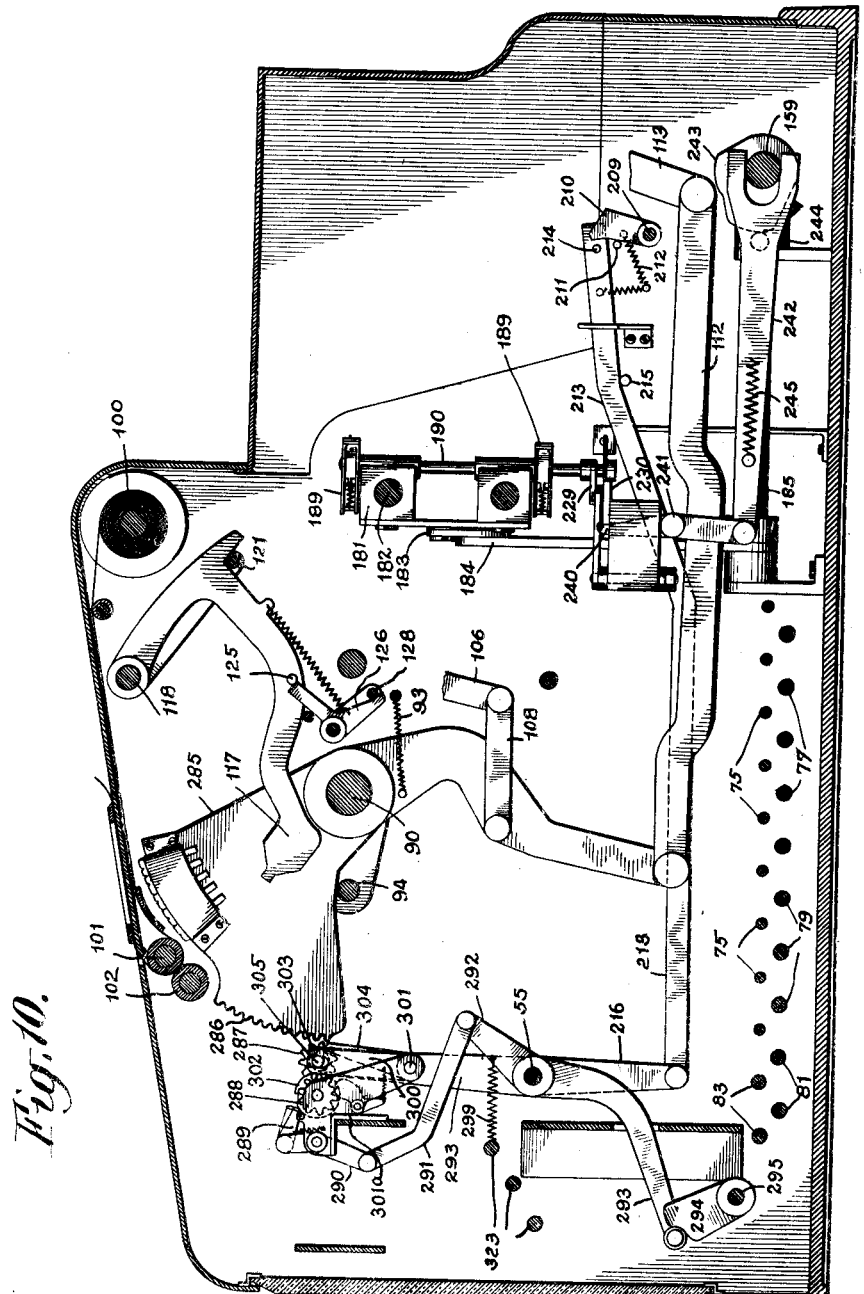

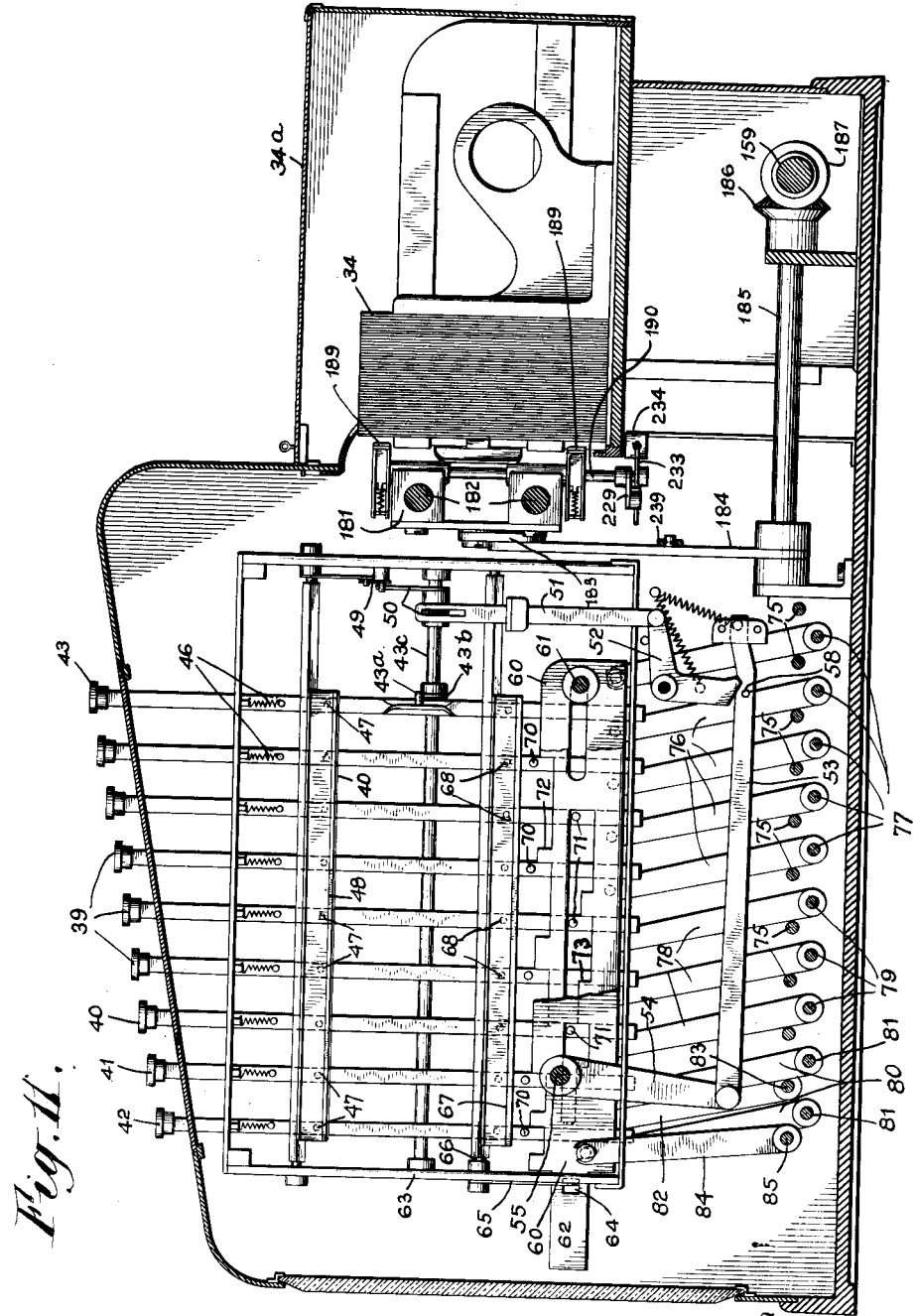

Dec. 31, 1929.  J. R. PEIRCE  1,741,201
ACCOUNTING MACHINE
Filed Nov. 10, 1923   13 Sheets-Sheet 9
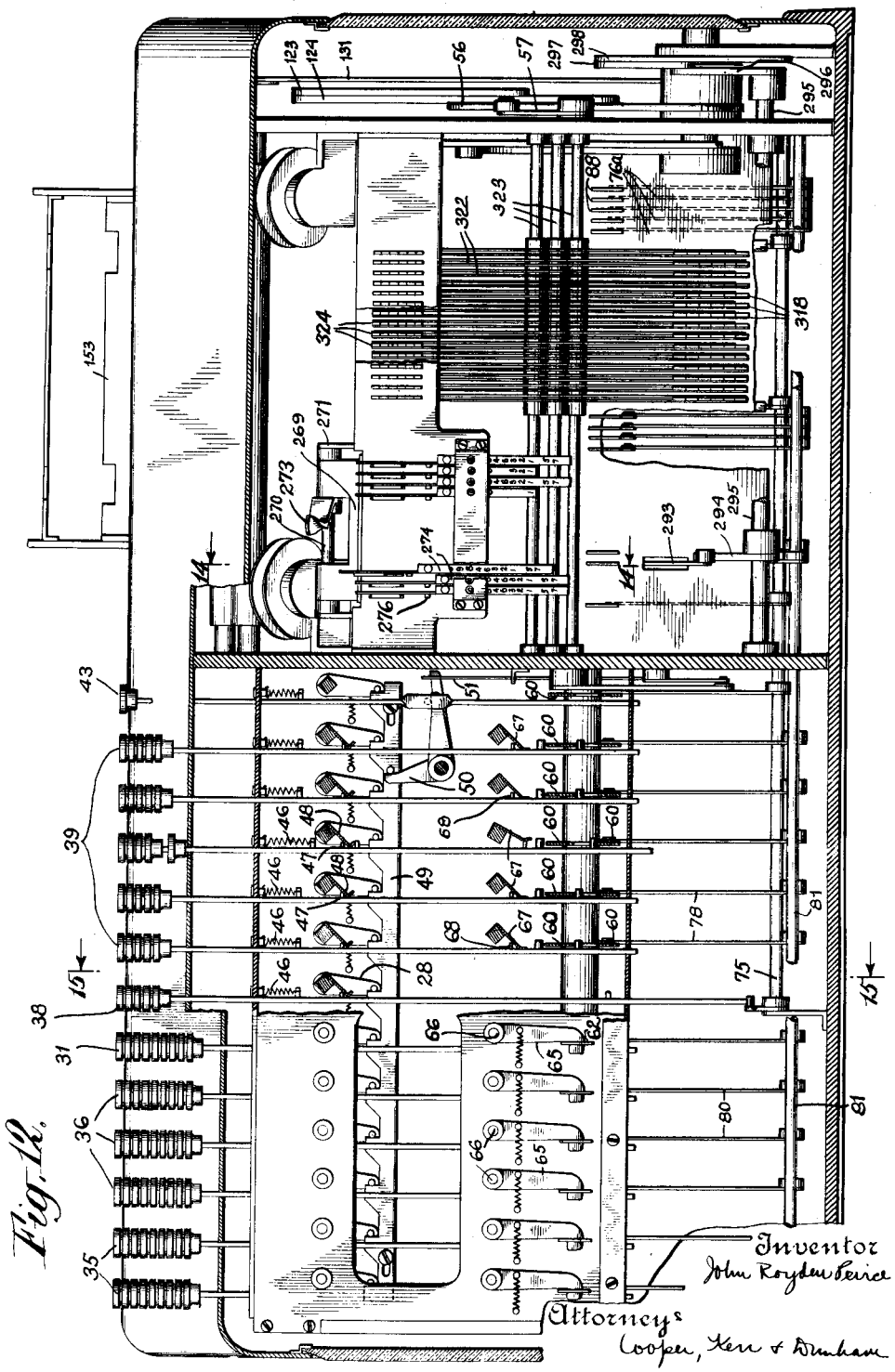

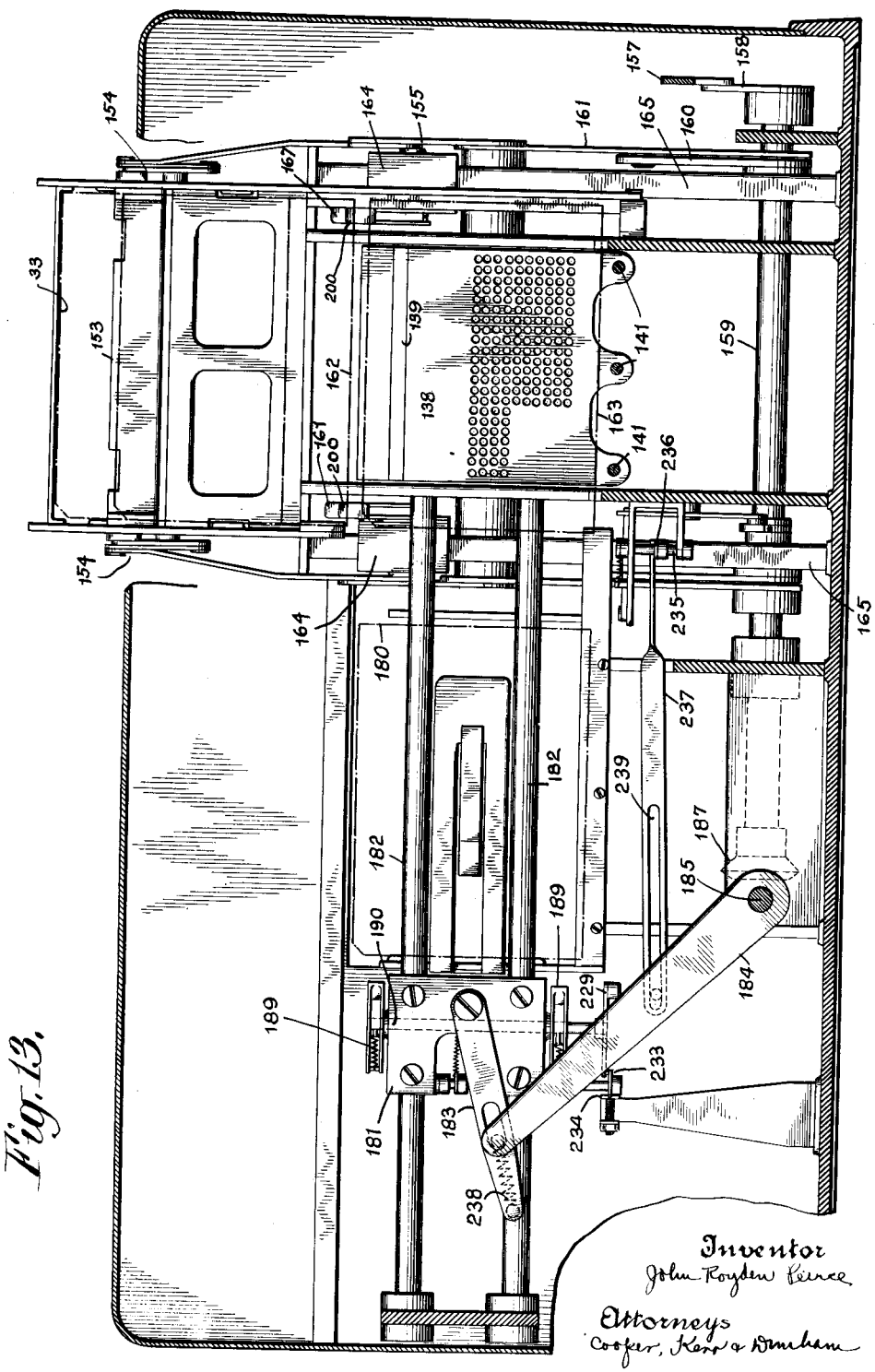

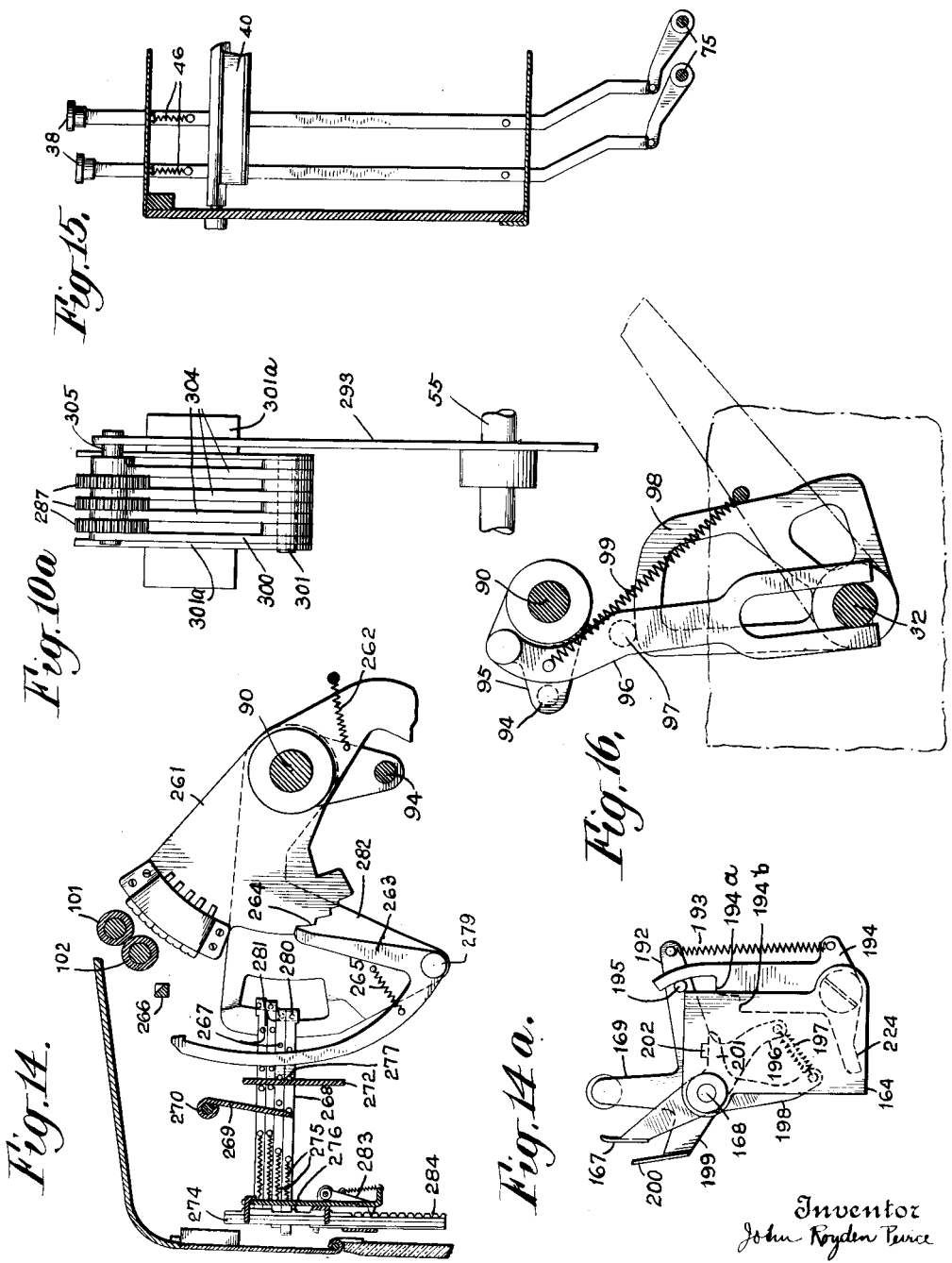

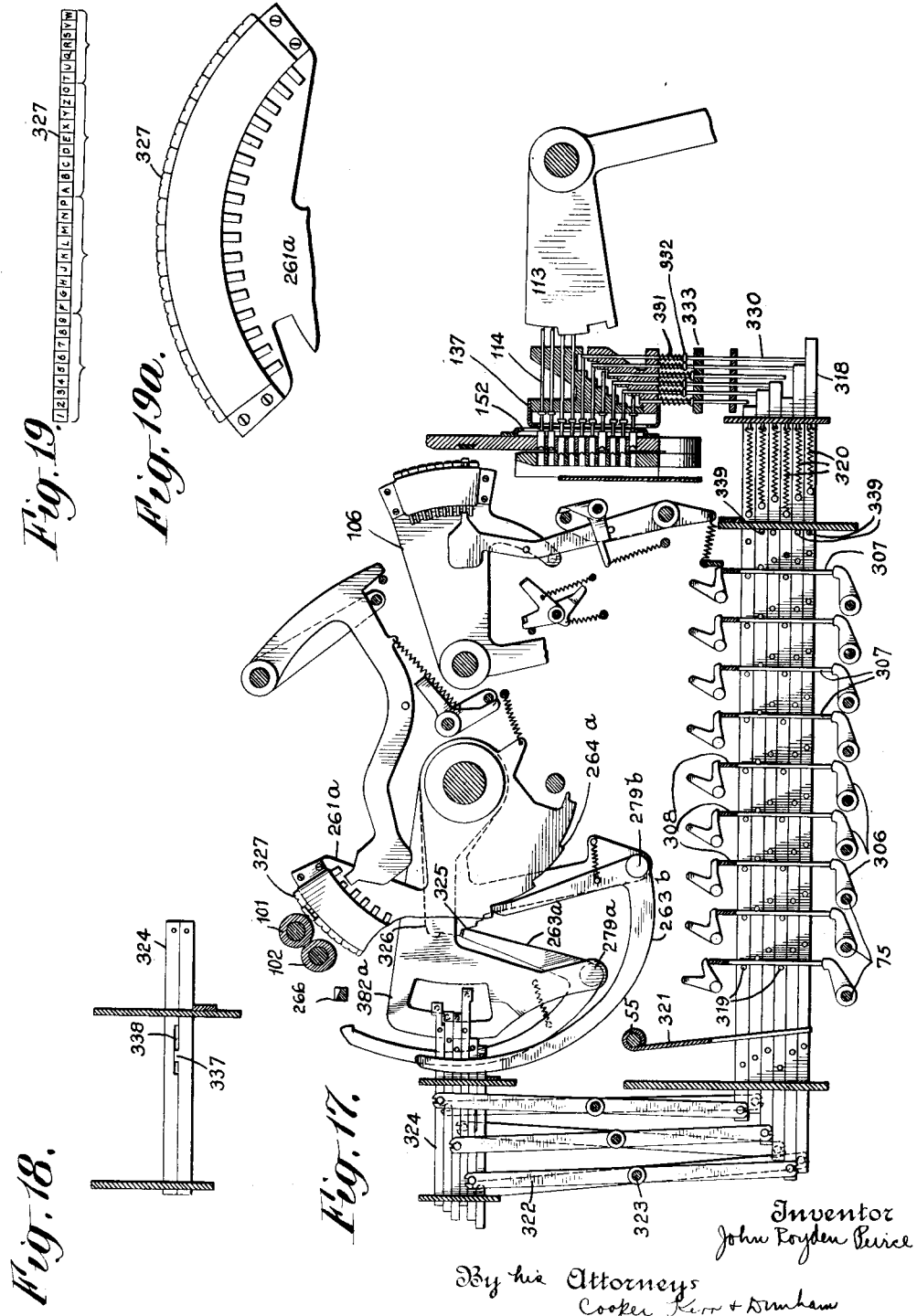

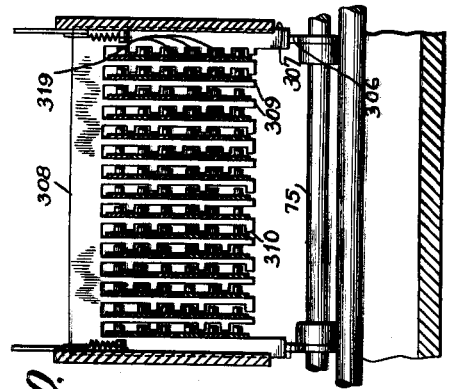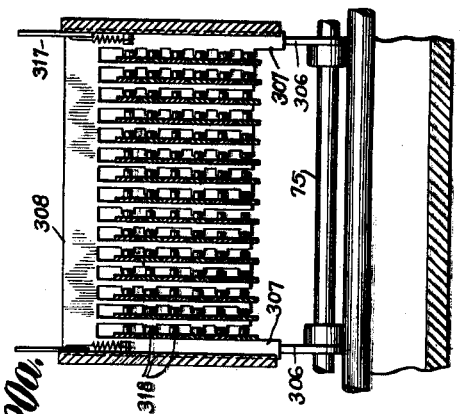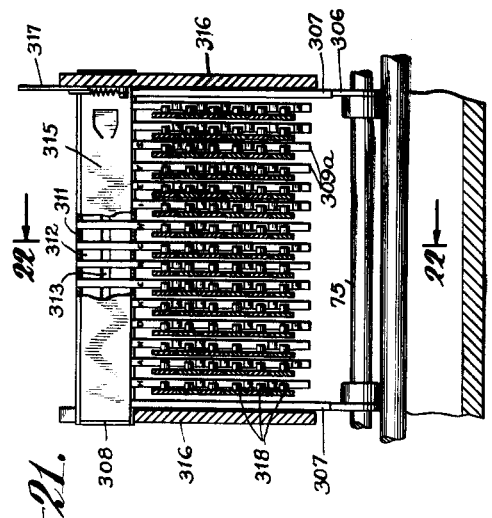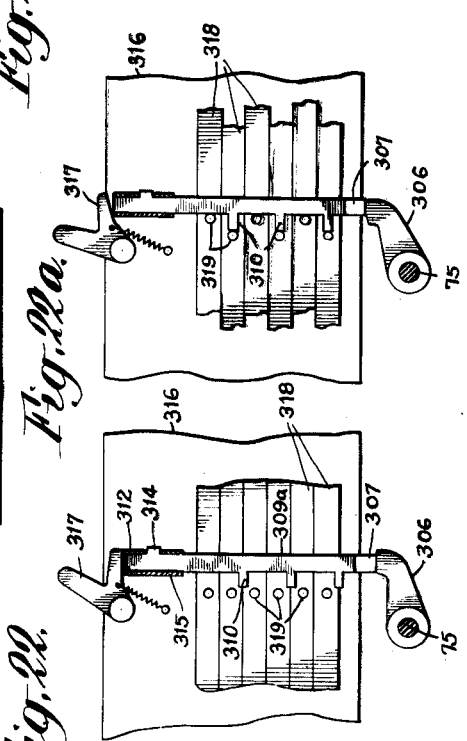

Patented Dec. 31, 1929

1,741,201

UNITED STATES PATENT OFFICE

JOHN ROYDEN PEIRCE, OF NEW YORK, N. Y., ASSIGNOR TO COMPUTING-TABULATING-RECORDING CO., OF NEW YORK, N. Y., A CORPORATION OF NEW YORK

ACCOUNTING MACHINE

Application filed November 10, 1923. Serial No. 673,921.

The present machine is particularly adapted for use in mercantile establishments where goods are sold over the counter and where a rapid audit is desired of the various transactions. For example, at the present time in a department store it is the practice for a sales person to make out a written sales slip, a copy of which is given to the customer, another copy being kept by a cashier or other person. At the close of the day the sales person adds up the stubs in the sales book and reports the total amount of business transacted. The sales slips of a given department are sent to the auditing department where they are gone over and the totals added up to determine the aggregate of the day's business for a given department and for a given sales person. The totals for each department are checked with the cash received by the cashier for that department and the individual sales person's totals, as determined by the auditing department, are checked with the totals kept by each sales person in his or her sales book. This method of auditing frequently introduces errors since written records are utilized and in addition the duplicate sales slips have to be gone over may times to secure the desired audit information.

The present invention has for its objects the provision of a machine which will print the data as to the class and amount of goods sold, kind of transaction, machine number, sales person's number, consecutive sales number, date of the transaction and amount of the transaction. This information is all printed upon the sales slip by a suitable machine which is operated by the sales person. Concurrently with the making of the printed sales slip, the machine makes another record which may be termed an audit record or card. This audit card has printed upon it by the machine printed data corresponding to that printed upon the sales slip and is perforated as well. Preferably the card contains no printing representative of the class or name of the goods sold, but such data is designated thereon solely by perforations. These audit cards, at the close of a day's business, are removed from the machine and sent to the auditing department. In the auditing department there is an installation of sorting machines and tabulating machines. By first sorting cards into the desired groups and afterwards running them through the tabulating machines a rapid audit can be made of the audit cards. This audit can be made without the attendant delay and mistakes which heretofore occurred with audits of written sales slips.

Further objects and advantages of the present invention will be hereinafter more fully pointed out in the accompanying specification and claims and shown in the drawings, which by way of illustration, shows what I now consider to be one and a preferred embodiment of the invention.

In the drawings,

Fig. 2 is a view of one of the audit cards produced by the machine.

Fig. 3 is a view of one of the sales slips made by the machine corresponding to the audit card shown in Fig. 2.

Fig. 4 is a diagrammatic view showing the combination hole code as utilized by the machine for designating alphabetical and digital characters.

Fig. 5 is a form of code used for designating digital characters only.

Fig. 8 is a similar view taken on line 8—8 of Fig. 6.

Fig. 9 is a similar detail sectional view taken on line 9—9 of Fig. 6.

Fig. 10 is a sectional view taken on line 10—10 of Fig. 6.

Fig. 10ª is a detail of a serial number counter shown in Fig. 10.

Figure 6:
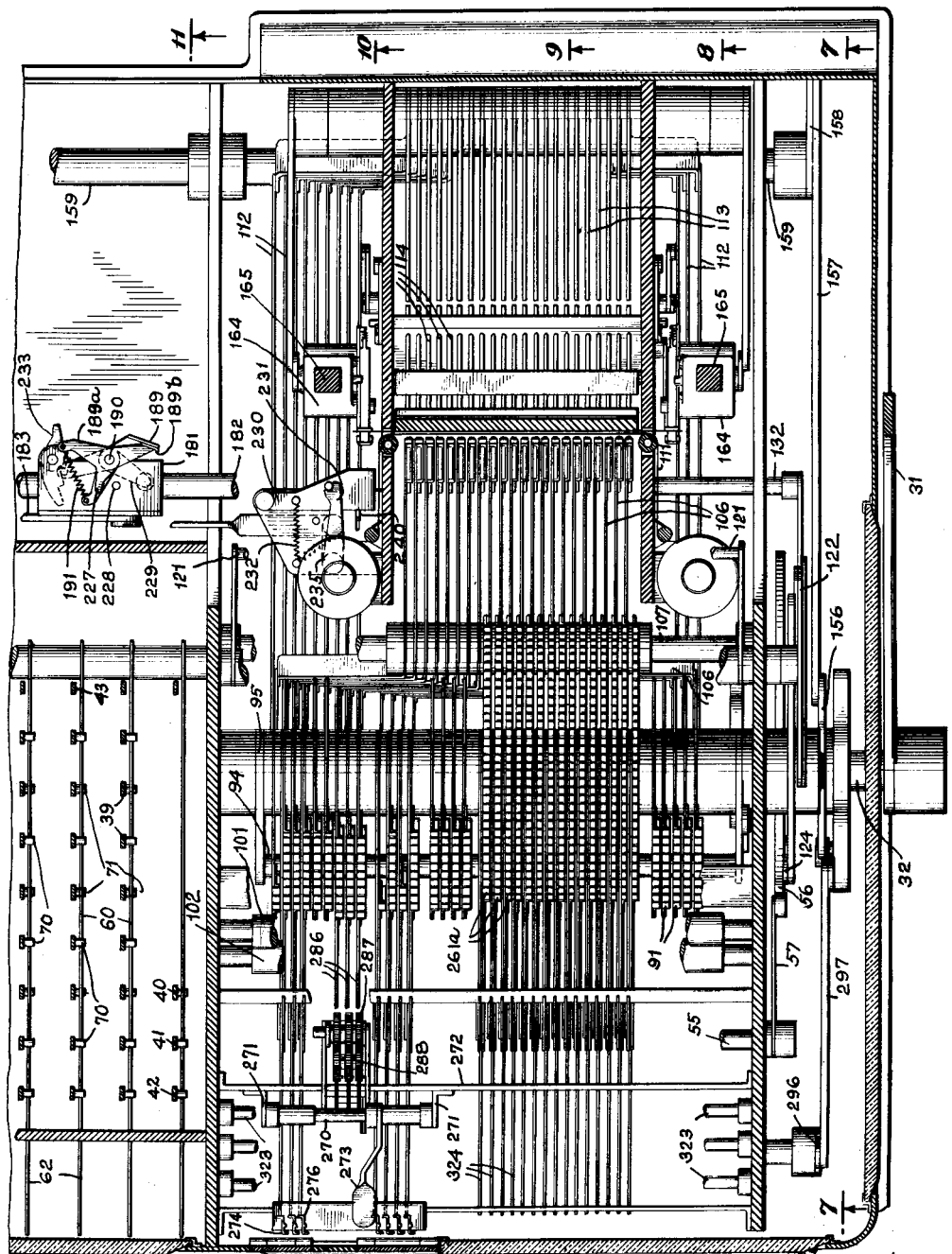
Fig. 6 is a top plan view of the machine with the cover and certain parts of the key board and paper strip devices removed to show the construction beneath.

Fig. 11 is a sectional view taken on line 11—11 of Fig. 6.

Fig. 12 is a front view of the machine with certain cover plates removed and part of the mechanism of the machine broken away to show the parts in the rear thereof.

Fig. 13 is an elevational view of the audit card feeding mechanism and mechanism for transferring the audit cards from the perforating station to the storage stacks.

Fig. 14 is a detail sectional view of certain of the parts shown in Fig. 12 taken on line 14—14 thereof.

Fig. 14ª is a detail of a card clip.

Fig. 15 is a detail view taken on line 15—15 of Fig. 12.

Fig. 16 is a detail of mechanism for operating one of the type sectors shown in Fig. 14.

Fig. 17 is a view of certain of the parts shown in Fig. 9 in moved position for printing a record upon the sales slip, and printing and perforating the record on the audit card.

Fig. 18 is a detail of part of the mechanism shown in Fig. 17.

Figs. 19 and 19ª are detail views showing the arrangement of the type on the type sectors.

Fig. 20 is a detail sectional view of the selecting slugs taken on line 20—20 of Fig. 9.

Fig. 20ª is a view of the same parts in displaced or operating position.

Fig. 21 is a modified form of the construction of the slug shown in Fig. 20.

Fig. 22 is a sectional detail view taken on line 22—22 of Fig. 21.

Fig. 22ª is a similar view showing the parts displaced to operative position.

Figure 1:
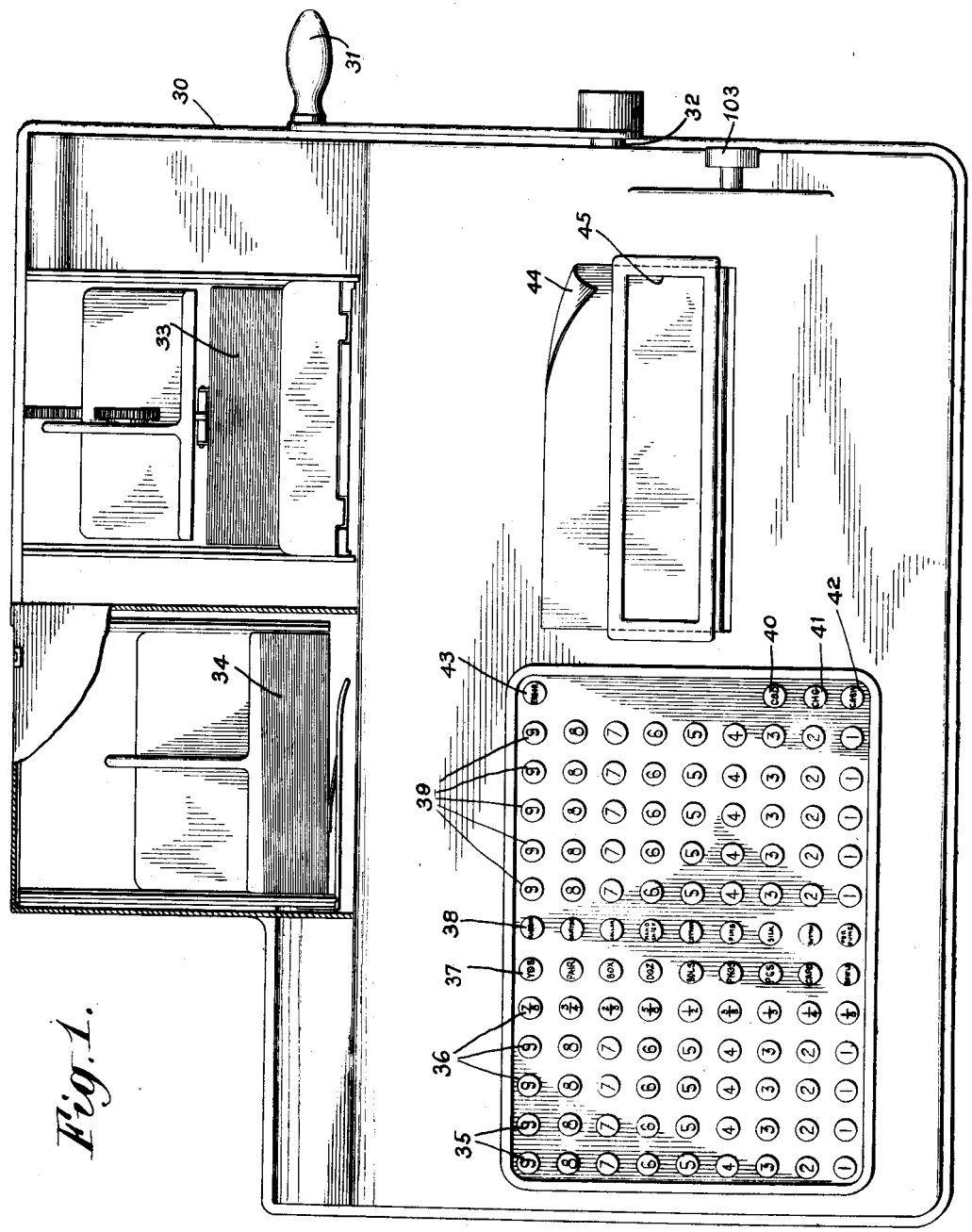
Fig. 1 is a top plan view of the machine.

In more detail, the machine as shown in Fig. 1, comprises a case or housing 30 having at one side an operating handle 31 carried on the end of main shaft 32. 33 designates a supply stack of blank audit cards 34 is the discharge stack of audit cards after being perforated and printed by the machine. These completed cards are transferred into and kept in a locked compartment 34ª A suitable keyboard is provided which has banks of keys as follows: keys 35 designate the sales person's number. Keys 36 designate the quantity of goods being sold. Keys 37 designate the unit of measurement of the goods being sold. Keys 38 designate the class of the goods. Keys 39 designate the amount of the transaction.

In addition to the above key banks there is a supplementary key bank containing three keys 40, 41 and 42, These keys respectively designate the class of transaction, i. e., C. O. D., charge and cash. To release a key depressed in error, an error key 43 is provided.

In Fig. 1, 44 designates the emergency sales slip and the case of the machine is provided with a suitable writing table having an aperture 45 to permit the sales person to write the name and address of the purchaser upon the sales ticket.

The keyboard is of the type commonly used in accounting machines, the keys being spring-pressed upwardly by suitable springs 46 (Figs. 11, 12 and 15). Each key stem carries a suitable stop pin 47 which is adapted to be engaged by a spring-pressed locking bail 48. These locking bails are provided with suitable levers 28 (see Fig. 12) having pins thereon to engage a common reset bar 49. This bar is actuated by the rocking of the levers 50, which rocking may be effected through the depression of the error key 43, having a pin 43ª acting upon a lever 43ᵇ on the shaft 43ᶜ, or by the drawing down of a link 51 which, at its lower end, connects with a pawl 52. To rock the pawl clockwise a transverse bar 53 is provided which, at one end, connects to a lever 54 fixed to shaft 55.

Figure 7:
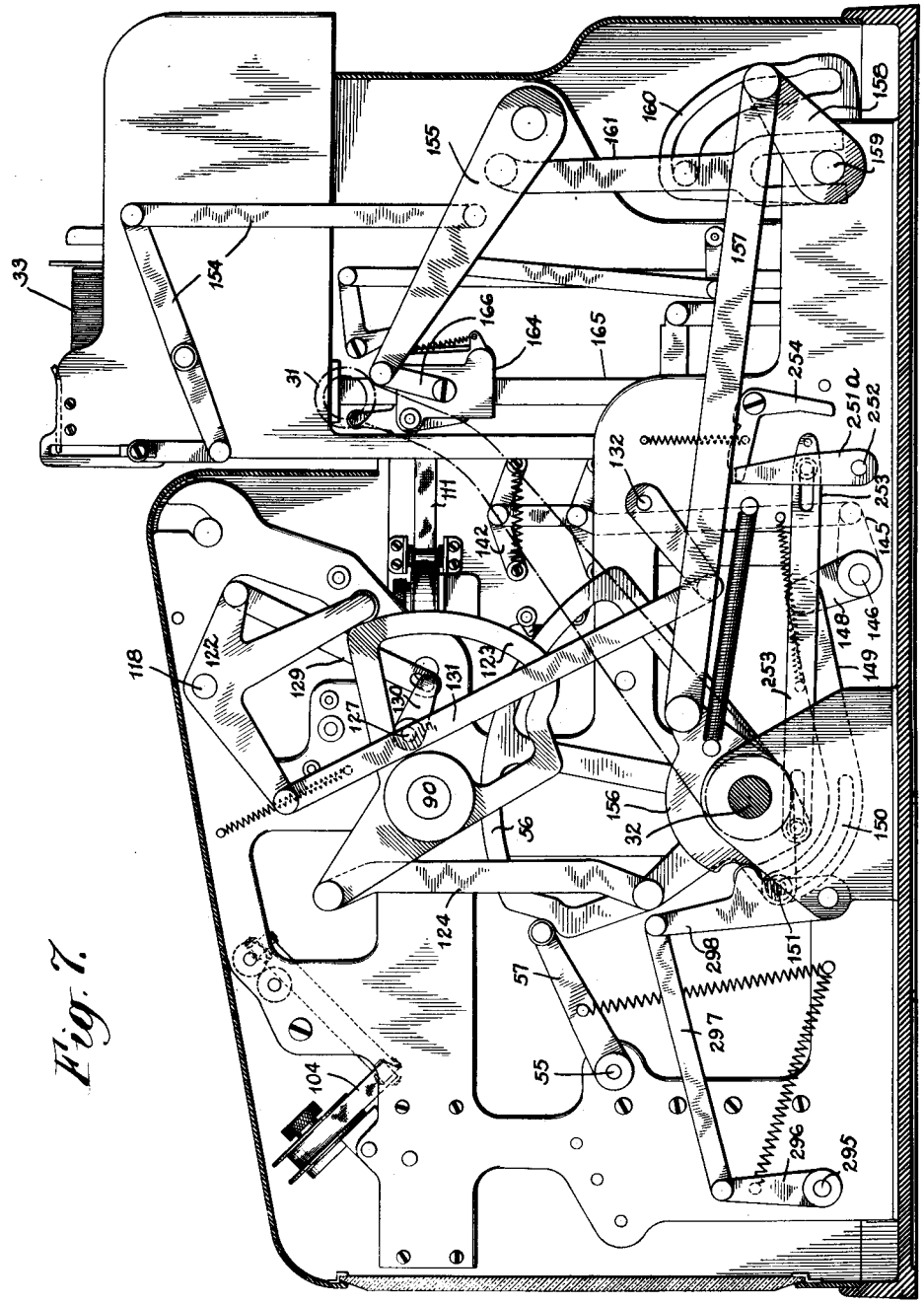
Fig. 7 is a side sectional elevational view of the machine taken on line 7—7 of Fig. 6.

Referring now to Fig. 7, fixed to the main shaft 32 of the machine is a cam 56, which, on actuation of the handle, is adapted to rock a spring-drawn arm 57 fixed to shaft 55. In this way the bar 53 (Fig. 11) is forced to the right. The spring support at the right hand end of the bar allows a pin 58 carried thereby to be cammed down by the pawl 52. Near the end of the return stroke of the handle the shaft 55 is rocked in a clockwise direction whereby pin 58 engages the pawl 52 and draws downwardly on link 51 to release any of the depressed keys.

Referring now to Figs. 11 and 12, each key bank is provided with a comb or stepped plate 60, which plates are slidably mounted at one end upon a shaft 61 and which, at the other end, carry an extending portion 62 which slides in a suitable slot in the side frame members 63. Each plate 60 at its end outside the plate wall 63 is provided with a notch 64 into which a zero pawl 65 is adapted to engage. The zero latches are mounted upon shaft 66, which, as shown in Figs. 11 and 12, carry bails 67. These bails cooperate with suitable pins 68 on the key stems. The depression of a key in any bank rocks its corresponding bail 67, releases its zero pawl 65 from the notch in the plate 60 and permits this plate to move to the right until the steps thereof are arrested by pins 70 or 71 upon the key stems. Each plate 60 has an upper group of steps 72 and a lower group of steps 73. The pins 70 on the keys cooperate with the step 72 and the pins 71 which are lower down on the adjacent keys cooperate with the lower steps 73.

The number 9 key of the 39 group is not provided with any stop pin 70; neither is there a stop on the comb plate 60 for cooperation with this key. It will be further noted that there is clearance in the notch 64 so that the plate 60 may have a slight movement corresponding to an amount of one unit irrespective of whether pawl 65 is removed from notch 64 or not. It therefore follows if no key in the amount bank is depressed, the plates 60 can move one step to the right. On the other hand, if the 9 key is depressed the plates 60 will move to their full extent to the right until arrested by shaft 61 contacting with the end of the slot in the plate. The one step or unit of movement is adapted to bring zero on the printing device to the printing line.

Referring now to Fig. 12, it will be noted that comb plates 60 are provided for all of the key banks with the exception of the No. 38 bank. The keys in the 38 bank do not cooperate with comb plates at all but directly rock individual rock shafts 75 in the manner shown in Fig. 15 of the drawings. As shown in Fig. 11 there are nine of these rock shafts 75. Suitably attached to the comb plates 60, which are provided for the amount keys 39. are individual levers 76. These levers individually connect the five comb plates to rock shaft 77.

Where the comb plates 60 cooperate with the quantity keys 36 three levers 78 are provided similarly connected to rock shafts 79. Levers 80 connected to the comb plates cooperate with sales person keys 35 and individually connect to two rock shafts 81. The comb plate cooperating with unit keys 37 connects to lever 82 which connects to a single rock shaft 83. The step plate 60 cooperating with the class of transaction keys 40, 41 and 42 connects to lever 84 which in turn connects to rock shaft 85.

Inasmuch as the operations of the parts cooperating with amount keys 39, the class of transaction keys, the unit keys, the quantity keys 36 and the sales person keys 35 are substantially the same only one cooperating connection and cycle will be traced.

Consider one of the No. 8 amount keys of the 39 group to be depressed. Its corresponding step plate 60 after the main actuating handle is actuated will move to the right under suitable spring tension from springs to be hereafter described. The lateral movement of this plate is to be considered in two steps,—first a unit movement corresponding to the clearance of notch 64, and second, eight steps of movement corresponding to the movement between the stop pin 70 and the upstanding lug 72 of the comb plate. This lateral movement of the stop plate 60 will impart a corresponding degree of rocking movement to one of the shafts 77.

Referring now to Figs. 8 and 12 the shafts 77 extend across the machine and at their opposite ends carry levers 76a. These levers at their upper ends connect to supplementary plates 88 which in some respects are similar to the comb plates 60. These plates 88 are suitably guided for slidable movement and have individual pin and slot connections to sectors 89 grouped in pairs and have a single striking plunger 92 for each pair. Plate 88 when released will move to the right eight plus one steps and bring the No. 8 type to the printing line when the sector 89 is permitted to be displaced anticlockwise.

Sector operation

Movement of the sectors 89 and the various cross shafts, combs, etc., is effected by means of springs 93. The sectors 89 are normally restrained against movement by means of a restoring bail 94, the arms of which are loose on the shaft 90. The means for actuating the restoring bail will now be described.

Referring to Fig. 16 bail frame 95 connects to a link 96 which is forked to slidably engage the main shaft 32 in the machine. This link carries a cam follower roll 97 which is normally retained in engagement with cam 98 by a tension spring 99. Cam 98 is fixed to the shaft 32 and upon the rocking of this shaft in a counter-clockwise direction the spring 98 will pull the restoring bail down rocking it in a counter-clockwise direction thus allowing one or more sectors 89 to rock to their various positions. Upon the reverse movement of the shaft 32 cam 98 positively restores the sectors to home position.

The sales slip 44 is preferably taken from a supply roll 100 (Fig. 8) suitably disposed within the machine. From this supply roll the paper passes over an impression roller 101 which roller co-acts with a second roller 102. The advance of the paper is effected by a suitable knob 103, Fig. 1, carried on the end of the impression roller shaft. The usual ink ribbon 104 which has suitable supply and takeup rolls is indicated in Fig. 7.

The sectors 89 just described are those used for effecting imprints upon the sales slip. During sales printing operations corresponding printing and a set-up for perforating is effected upon the audit card.

Referring to Fig. 8, a plurality of type sectors 106 are suitably pivoted upon a shaft 107 which sectors are link connected by links 108 to the sectors 89 so as to be displaced proportionally thereto. Sectors 106 carry type 110 arranged singly instead of in pairs but carrying similar characters to the type 91. For this type an inking ribbon 111 is provided.

In order to set the audit card punches the sectors 89 are connected by links 112 to a comb sector 113, Fig. 9. This comb sector swings back of punch plungers 114 which at their forward ends carry punches 115. The positioning of the comb sector 113 selects combinations of punches for operation at a later point in the cycle.

It may be explained that the printing on the sales slip and the audit card takes place substantially simultaneously and the actual punching operation is effected at a later time in the machine cycle.

Sales slip hammer mechanism

Referring to Fig. 8, suitable hammer elements 117 are pivoted upon a shaft 118. These hammers are normally urged against the type by springs 120. Fixed on shaft 118 is a hammer restoring bail 121. This bail is swung away from the hammers prior to a striking operation by mechanism shown in Fig. 7. The T-shaped lever 122 is fixed to the end of shaft 118 and has one of its arms cooperating as a cam follower with a cam 123 pivoted on shaft 90. Cam 123 is connected by link 124 to the cam 56 which is fast to the main driving shaft 32 of the machine. Upon the actuation of the handle the T lever 122 is rocked clockwise at the proper time in the machine cycle, thereby displacing the bail 121 (Fig. 8). Hammers 117 now tend to swing clockwise but are arrested by pins 125 thereon contacting with the ends of bell crank members 126. These bell crank members are suitably pivoted on a shaft 127 and are adapted to be rocked clockwise by means of a bail 128 which bail is fixed to the shaft 127 and actuated by a link 129, Fig. 7. Link 129 has a lost motion pin and slot connection with an arm 130 fixed to the shaft 127. At a suitable time in the cycle hammers 127 are released by the bell crank levers 126 and permitted to strike the type. To limit excessive hammer movement a stop shaft 128$^a$ is provided.

In order to print all zeros standing at printing position to the right of a significant character, and to suppress the printing of all zeros standing to the left of such character, the following mechanism is provided: For each sector 89$^a$, bell crank lever 350 and a lever 351 are loosely carried on a shaft 352; the lever 350 being urged by a spring 353 to turn in a clockwise direction and lever 351 being urged to turn in a counter-clockwise direction by a spring 354. The lever 351 engages a pin 355 on the sector 89 and has a bent over edge 356 engaging lever 350. Each of the several bell crank levers 350 has a laterally extending projection 357 engaging the end 358 of the next succeeding one of levers 350. When the sectors 89 move one step, representing the slot 64 in Fig. 11, they will, as we have seen, present the zero type at printing position. During this slight movement, the pin 355 permits lever 351 to turn slightly, carrying lever 350 with it. The lever 350 will then be in position to be engaged by pin 125 when the hammer is released by bail 121 and latch 126, so that normally, the hammer will not strike the type. But when any sector moves beyond the zero position, lever 351 will turn through a greater angle, carrying lever 350 beyond the path of pin 125, so that the hammer will be free to operate. When any of the levers 350 turn beyond the path of pin 125, it will carry all of those to the right with it, if they have not individually so moved. It will be understood that each spring 354 is strong enough to overcome as many of the springs 353 as it may be called upon to oppose.

Referring to Figs. 9 and 17 the type sectors 261$^a$ may be so arranged that, when in normal position, they will have to move two steps to present the first character at printing position. Then, normally, when the parts are released, they will all move one step before taking up the slack or lost motion in the sectors 382$^a$ and levers 263$^a$, etc. This will afford sufficient swing when the parts are restored, to insure carrying the steps 325, 364$^a$ past the ends of levers 263$^a$ and 263$^b$. When the hammers 117 are released to actuate the type, they are free to swing through their full arc, until stopped by the bar 128$^a$. If the sector has not moved beyond the one step, the hammer will, of course, not strike any type, and no character will be printed.

*Hammer mechanism for audit card type*

Referring to Figs. 7 and 9 a link 131 is connected to the T lever 122 and adapted to rock a shaft 132. This shaft pivotally supports the audit card hammers 133 and has fixed thereto restoring bail 134, which bail upon swinging to the right is adapted to actuate bell crank lever 135 which then allows the hammers to swing forward under spring tension and actuate the type. The return stroke of bail 134 releases latch 135 and restores the hammer. The latch then locks it in position.

The zero hammer release for hammers 133 (Fig. 9) is like that shown in Fig. 8 for hammers 117. The movement of sector 106 to zero printing position permits slight movement of lever 351$^a$ which in turn moves lever 350$^a$ into position to stop the hammer 133. Further movement of the sector causes further movement of said levers and frees the hammer.

*Punch operation*

The punch plungers 114 are slidably mounted in a frame 137, Fig. 9. The punches 115 themselves are guided in a plate 138 which also carries the impression block 139 for the audit card type. The audit card prior to the punching operation is fed in between plate 138 and another plate 140. Both of plates 138 and 140 are slidably mounted on suitable guide rods 141 (see Fig. 13). When a punching operation is to be effected the plates 140 and 138 are bodily displaced to the right from the position shown in Fig. 9. The comb sector 113 having been previously disposed behind the punch plungers 114, upon movement of the plates 140 and 138 to the right, certain selected punches will be forced through the card in the manner shown in Fig. 17. For effecting the slidable shifting of the guide and type plates the following mechanism is provided. As shown in Fig. 8, the plate 140 is connected to a toggle mechanism 142 which toggle mechanism at one end is attached to plate 143. For actuating the toggle mechanism a link 144 extends downwardly and connects to crank 145 fixed to shaft 146. Suitable springs 147, 148 normally hold the toggle open and the plate 140 in left hand position.

Referring to Fig. 7, shaft 146 has fast to it a crank arm 148 connected to link arm 149 having a curved slot 150 at its opposite end. Extended into this slot is a pin 151 which pin is carried by a suitable arm fixed to shaft 32. At the proper time in the operating cycle, after the printing operation is completed, pin 151 abuts against the end of the slot in link 149 and rocks shaft 146 clockwise thereby drawing down on the toggle mechanism 142 shifting the die plate and associated parts to the right thereby effecting the punching operation. The restoration of the toggle mechanism is adapted to draw forward such punches as have not passed through the card, a suitable plate 152 being provided for this purpose. The punch plungers 114 are also provided with suitable collars cooperating with the frame 137 to prevent the plungers being drawn too far forward and into the path of the next inserted audit card.

*Audit card feed to printing and perforating position*

The foregoing description has assumed an audit card adjacent the type 110 and in front of the punches 115. For automatically placing these audit cards in operative position suitable audit card feeding mechanism is provided. This will now be described.

Referring to Figs. 1 and 9 the blank audit cards are placed in the supply stack 33 and pressed forwardly by a spring follower of any well known type. From the supply stack cards are removed one by one by means of a suitable picker 153 operated through a linkage 154 (Fig. 7) connected with an arm 155. Fixed to shaft 32 is a member 156 having a link connection 157 with a crank arm 158 fixed to shaft 159. Also fixed to shaft 159 is a cam 160 which cooperates with a follower link 161 fast to the arm 155 previously referred to. At a suitable time in the operation of the machine, arm 155 is actuated to operate the picker mechanism and advance one card from the stack to the dotted line position 162, Fig. 13. From this position clips are provided to feed the card to printing and punching position shown in dotted lines 163. This clip mechanism comprises clip carriages 164 mounted on square posts 165 on the opposite sides of the card. These carriages are connected as shown in Fig. 7 by links 166 to arm 155 and are reciprocated up and down by the operation of said arm. Carried by the carriage 164 are the card clips 167 (Figs. 8 and 14ª) rotatable on a stud 168. Also carried on this stud is a lever 169 having a follower adapted to cooperate with a cam member 170.

Integral with lever 169 is an arm 192 having a spring 193 attached to a lever 194 which lever in turn cooperates with a pin 195 on the arm 192. Also integral with lever 169 is an arm 196 having a spring 197 connected also to the arm 198 which is integral with the clip 167. Another arm 199 which is also integral with arm 169 carries the clip jaw 200. A projection 201 on the clip 167 cooperates with a stop 202 on the carriage 164. As the carriage 164 is reciprocated by lever 155 and as the parts approach upper end of their stroke the follower arm lever 169 rides up the cam 170 to the position shown in Fig. 8. This rotates the lever 169 counter-clockwise, turning the clip 200 to the open position and permitting clip 167 to turn in the same direction under the influence of spring 197 to engage step 202. The clips are now in position to receive the card. At the end of the upward stroke the cam 170, which is pivoted to the frame of the machine at 203, is released by the latch 204 which cooperates with a pin 205 on the said cam. A spring 206 then moves the cam away from the lever 169 and permits the spring 193 to turn the same clockwise closing the clips upon the card. The pin 195 then rests against the shoulder 194ª on the lever 194. The actuation of lever 204 is effected through a link 207 connected to a lever 208 on a shaft 209 which shaft also carries a trip pawl 210, Fig. 10, held in normal position against pin 211 by a spring 212. An arm 213 carrying a pin 214 and adapted to slide on a fixed pin 215 is connected to a lever 216 fixed on shaft 55. Counterclockwise rocking of said shaft as heretofore set forth causes link 213 to rock shaft 209, tilting latch 204 and releasing cam member 170. This, as seen by cam 56, (Fig. 7) takes place during the early part of the stroke of handle 31. When the card reaches its position between the guide plates 138 and 140 and engages the bottom of the slot, it is stripped from the clips. Thereafter in the continued downward stroke of the carriage 164 the arm 224 of lever 194 strikes a fixed pin 225 turning lever 194 clockwise and releasing pin 195 permitting spring 193 to further rotate the clip 200 in a clockwise direction carrying with it the clip 167 until the pin 195 engages the shoulder 194ᵇ. The clips are now in a position out of the plane of the card and ready for their return stroke.

At the proper time in the cycle of the machine the cam 170 is returned to operative position to be locked by latch 204 by the following mechanism. A bell crank lever 246, (Fig. 8) is adapted to engage the back of said cam when the latter is clockwise. This lever is connected to a link 247 which in turn is connected to a lever 248 pivoted at 249 and connected by a link 250 to a lever 251 fixed on shaft 252. Said shaft has fixed thereon a crank 251ᵃ having pin slot connection with a link 253, Fig. 7, which in turn has a pin and slot connection with member 156. Near the end of the stroke of the handle 31, the link 253 will engage the spring-pressed latch 254 and release lever 251. Further movement of said link will rock said lever and shaft 252 clockwise, and through the connections mentioned, restore cam 170.

Audit card feed to storage stack

The mechanism for feeding the card from the position 163 to the position 180 (Fig. 13) in the storage stack 34 (Figs. 1 and 11) is shown in Figs. 6, 10, 11 and 13. This mechanism comprises a carriage 181 slidable on guide rods 182. The carriage is in turn connected by a link 183 having pin and slot connections with a lever 184 fixed on a shaft 185 having a bevelled gear 186 meshing with a similar gear 187 on the shaft 159, adapted to be oscillated as heretofore set forth. Mounted on carriage 181 are the upper and lower sets of card clips 189 pivoted at 190.

The clip 189ᵃ is provided with an arm 227 adapted to engage a pin 228 on the carriage 181 and is also provided with a spring 191 tending to hold the clips closed. An arm 229 on the clip shaft 190 is provided with a follower adapted to cooperate with a cam 230 to rotate the parts counter-clockwise about their pivot 190 so that arm 227 will strike pin 228 fixing the position of the inner clip 189ᵇ and causing the clip 189 to turn slightly further to an open position. At the end of the inward stroke of carriage 181 the cam 230 is released by latch 231 and moved to inoperative position by a spring 232 permitting the clips to close upon the card. The carriage is then moved in an outward stroke carrying the card to the stack 34 where it is stripped from the clips. At the end of this stroke the lever 233 engages a stop 234 (Fig. 13) releasing the clip members and permitting them to take the position shown in Fig. 6 ready for a return stroke. The mechanism of these clips is more or less shown in greater detail in connection with the clips for moving the card to the analyzing position. The actuation of latch 231 to release cam 230 is effected in the following manner.

Said latch is fixed on a shaft 235 having a lever 236 connected by a link 237 to the lever 184 by a pin and slot connection. As lever 184 turns clockwise to actuate the clip carriage 181, when the latter reaches the end of its stroke the spring 238 stretches permitting the further movement of lever 184 until the pin reaches the end of slot 239 moving link 237 to actuate said latch 231. At the proper time in the cycle of the machine a lever 240 cooperating with cam 230 returns the latter to operative position where it becomes locked by the latch 231. Said lever 240 is actuated in the following manner. This lever (see Fig. 10) is pivoted at 241 and is connected to a link 242 bifurcated at its opposite end and guided on shaft 159. Said shaft also carries a cam 243 cooperating with a pin 244 on the link 242 to reciprocate the latter against the action of a spring 245.

Referring to the mechanism for printing the machine number and the date appearing on the audit slip shown in Fig. 2, this mechanism includes type sectors 261, (Fig. 14) loosely mounted on shaft 90 and actuated by spring 262 toward operative position. The bail 94 serves to restore the type sectors to normal or inoperative position, and, at the proper time, releases the same in the manner heretofore set forth. When released, the type sector will rotate counter-clockwise until stopped by the setting lever 263 cooperating with the stepped portion 264 of the sector. The setting lever is pressed by a spring 265 toward the sector, and in normal position hooks over the bar 266 as shown in Fig. 9. In such position it will hold the type sector in inoperative position so that no character will be printed.

Cooperating with the lever 263 are several pins 267 carried by bars 268. These bars are adapted to be restored toward the right by a restoring member 269 fixed on a shaft 270. Said shaft (Fig. 6) is carried in brackets 271 fixed to the partition 272, and may be manually actuated by a lever 273. Adjacent the left hand end of bars 268 are several manually adjustable stop members 274, (Figs. 6, 12 and 14) having lateral projections 276 adapted to engage bars 268 to prevent them from moving to the left under the influence of springs 275. To set the machine, the lever 273 is depressed to move all bars 268 to the right. The stops 274 are then set according to the scale, after which the lever 273 is released. Some of the bars 268 then advance to the left until their pins 277 engage the partition 272, others being stopped by projections 276. The lever 263 is differentially turned about its pivot 279 depending upon which ones of the bars 268 advance. This determines which of the steps 264 on the type segment shall engage the lever. The bars 268 also carry pins 280 adapted to engage a shoulder 281 on the segment 282 which carries lever 263. This segment is also loosely carried on shaft 90 and the pins 280 determine to what extent it may turn about said shaft when the type segment engages lever 263. Thus, when one of the steps 264 engages lever 263, the pivot 279 may be adjusted to any of several elevations. In this way, by the proper setting, any one of the several type may be caused to stop at printing position.

The setting up of the date will, of course, be done daily, but the machine number setting need not be disturbed after once having been adjusted.

A spring-pressed detent 283 cooperating with notches 284 may serve to hold the members 274 in the position to which they may be set.

Printing of the consecutive sales number is effected by type carried by sectors 285 (Fig. 10). These sectors are provided with gear teeth 286. Adjacent said teeth are pinions 287 carried by arms 300 adapted to rock on a stud 301 in bracket 301ᵃ (see also Fig. 10ᵃ). Adjacent pinions 287 and normally meshing therewith are pinions 288 adapted to be actuated by a spring-pressed pawl 289 carried by a lever 290 connected by link 291 to a crank 292 fixed on shaft 55. At the beginning of the machine cycle when shaft 55 is oscillated, pawl 289 will turn the first of the pinions 288 one notch. After this pinion has been turned nine notches, a cam member 302 connected thereto will permit the next of pawls 288 to engage and actuate its pinion one notch during the next cycle of the machine. This mechanism is well known and need not be shown here in greater detail. Fixed to each of pinions 287 is a projection 303 adapted to cooperate with a spring-pressed pawl 304 to permit unlimited counter-clockwise rotation of the pinion, but to limit the clockwise rotation thereof.

Immediately after the pawls 289 have acted, and before the sectors 285 commence to descend, a follower on lever 298 (Fig. 7) cooperating with cam 156 will, through link 297, lever 296, shaft 295 and cam 294 (Fig. 10), rock a lever 293 loosely supported on shaft 55. The upper end of lever 293 has a slot connection with the shaft 305 of pinions 287 (see also Fig. 10ᵃ). This lever will thus move pinions 287 out of mesh with pinions 288 and into mesh with the sectors. The sectors will then, on their descending stroke, rotate pinions 287 until they are stopped by pawls 304. This will place the type in position to print the values represented on the pinions. When the sectors are restored they will return the pinions to the positions in which they found them ready to receive another count.

*Printing name of commodity*

The printing of the name of the article is effected in the following manner: The depression of one of the keys 38 (Figs. 1, 12 and 15) as we have seen rocks one of the shafts 75. The opposite end of each of these shafts is provided with levers 306 (Figs. 9, 17 and 20 to 22ᵃ inclusive), upon which rest the sides 307 of a key insert member or slug 308. In Fig. 20 the key insert is shown as comprising all one piece, including depending fingers 309 having lateral projections 310. In Figs. 21 and 22 the insert is shown as comprising a box holder 311, one of the sides 312 of which has a slot 313. The fingers 309ᵃ have one end inserted in the box with a lug 314 in the slot; the sliding cover 315 serving to hold the fingers in place. The inserts are slidably mounted in the side frames 316 for movement up and down, and are pressed down by spring actuated levers 317. An insert representing an article may be removed and one representing another article put in its place. Also, in the form of insert shown in Fig. 21, the fingers 309ᵃ, each of which represents a letter of the alphabet or a digit may be so arranged in the holder that any desired word may be represented. Between the adjacent fingers 309 are bands of slidable bars 318, each bar having as many stop pins 319 as there are key inserts 308. The bars 318 are urged to the right by springs 320, and are restored to inoperative position as in Fig. 9 by a slotted restoring plate 321 fixed on the shaft 55. When shaft 55 is rocked counter-clockwise by the mechanism shown in Fig. 7, the bars 318 will be released as in Fig. 17 to move to the right. When all of the key inserts are down, all of the bars 318 will be free to advance. But when one of the inserts or slugs is raised, as is the first insert in Fig. 17, the projections 310 will be placed in the path of the pins 319 of some of the bars, and these bars will be prevented from advancing. Each of bars 318 is connected by a lever 322 (Figs. 9 and 17) pivoted at 323. These levers are in turn connected to bars 324 similar to bars 268 of Fig. 14. Thus, those of bars 318 that advance will move their corresponding bars 324 from the normal position of Fig. 9 to the left as in Fig. 17. The function of bars 324 is similar to that of the bars 268 in Fig. 14; the upper four of the bars serving to determine the extent to which the sectors 382ᵃ shall descend, and also to rock the lever 263ᵃ about its pivot 279ᵃ, to determine which of several steps 325 on an intermediate sector 326 said lever shall engage. The two lower bars 324 serve to set the lever 263ᵇ about its pivot 279ᵇ to determine which of the steps 264ᵃ on the type sector 261ᵃ it shall engage. By this arrangement, the sectors 261ᵃ carrying type 327 containing the alphabet and digits (Figs. 19 and 19ᵃ) may be so positioned that any desired character may be printed.

The two lever bars 324, as shown in Fig. 18 are inter-connected by means of a projection 337 on the first one reaching into a slot 338 in the second one. Referring to Fig. 9 the bars 318 are adapted to move to the right a distance determined by the position of a stop pin 339 in each bar. Thus, the lowest bar 318 is adapted to advance three steps, arbitrarily speaking, while the bar above it is adapted to advance two steps before its pin 339 engages the plate 340. If, as between the two lower bars 318, the first one only, moves, the movement will be restricted to one step by reason of the projection 337 on the first bar 324, engaging the end of slot 338. If the second of bars 318 advances, it will advance its full two steps with the second of bars 324. If both of the lower bars 318 advance, the second bar 324 will advance its full two steps and this, in turn, will permit the first of bars 324 to advance its full three steps. If the first bar 318 advances one step, it actuates lever 263$^b$ one step. If the second bar 324 advances two steps, it will actuate said lever two steps. And if the first and second bars 324 advance; the first one advancing three steps will actuate the lever three steps.

Referring again to Figs. 20, 21 and 22, it will be seen that the projections 310 in Fig. 20 are so disposed that the pins 319 engage them on the side, while in Figs. 21 and 22 these projections are at right angles to the position shown in Fig. 20, so that the pins 319 engage the ends thereof. Either of these forms will work satisfactorily, while the form shown in Fig. 21 will ordinarily permit the parts to be placed closer together if greater compactness is desired.

It will also be recognized that with the construction of Fig. 21, instead of making up complete units representing a great number of commodities, as would be necessary in Fig. 20, a stock of holders 308 and a stock of fingers 309$^a$ may be supplied with each machine, to be set up to represent the names of commodities as desired.

*Perforating name of commodity*

Referring to Figs. 2 and 3 it will be seen that all of the data printed by the machine on the sales slip, except the name of the commodity, is also printed across the top of the audit card, and in addition, perforated in said card in the field 328. While the name of the commodity could be printed on the audit card by connecting sectors 261$^a$ to additional sectors similar to sectors 106 in the same manner that these sectors are connected to sectors 89 (Fig. 8), this has been omitted. The commodity is shown as perforated, however, in the field 329 of the audit card. The mechanism for effecting this perforating is as follows: Of the several punches 115 (Figs. 9 and 17) the lower six are for perforating in the audit card, whatever is printed by type 327. Back of the rear ends of these punches are stops 330, pressed downwardly by springs 331 acting on collars 332. A restoring plate 333 (see also Fig. 8) normally holds the stops up in the position of Fig. 9. Said plate is carried by toggle links 334 connected to the lever 251. When this lever turns toward the left, it will lower the plate 333 and release the stops 330. With all of bars 318 in normal position as in Fig. 9, all of stops 330 would drop when released. But when some of said bars have moved to operative positions as in Fig. 17, such bars will prevent the stops 330 from dropping. Now, when the audit card is forced against the punches, those of the punches that engage the stops 330 will penetrate the card, but the stops that have dropped will permit their punches to move back. Thus, when a character carried by sector 261$^a$ is printed on the sales slip, the appropriate combination of holes according to Fig. 4 will be punched in field 329 of the audit slip.

It will be noted that the perforations in field 329 (Fig. 2) are in the reverse order to that shown in the diagram in Fig. 4. This is caused by the lowermost bar 318 acting to control the uppermost of the six alphabet punches.

While I have shown the audit records as being made upon separate cards it is to be understood that in its broader aspect the invention is not limited to individual records. Any form of audit record receiving material may be used which is adaptable to the reception of perforated records.

While I have shown and described my novel key insert structure in connection with an accounting machine, such as is used in a retail store, its use is more general and extended. For example, the key insert may be used in a recording machine of any type whether intended to print or perforate or both. Its application is particularly adapted, for example, to railway ticket machines in which it is desired to print or otherwise record data upon a railway ticket and in which this data is to be changed from time to time without seriously rearranging or modifying the machine. For example, in a railway ticket printing machine it may be desired to print upon tickets used by the machine the name of the station, the rate and like data. With such a machine it is obviously desirable that the selection of the data be made expeditiously. Attempts have been made to utilize differential setting devices and a separate type slug for the complete name of the station and the rate applying to the particular station. The use of such a slug type of machine has never been commercially successful since changes in station names and rates necessitate a removal of the complete slug and the replacement of the same by another. Other attempts have been made to utilize individual type carriers and to have individual keys control these type carriers through the instrumentality of intervening differential mechanism. In such machines it is necessary to press as many keys or set as many levers as there are letters and rate characters upon the ticket which is to be printed. This type of machine is obviously impractical on account of the multiplicity of manual operations which are necessary to control the printing of a name and a given rate.

The present invention finds particular utility in any machine of this general character in which a plurality of rows of type or perforating elements are provided and in which a plurality of these elements are to be controlled from a single setting device such as a key. In the present invention the setting of the key or the manipulation of an equivalent of a setting device effects a selection of a controlling device, also termed a key insert, which insert or controlling device in turn controls the differential displacement of a plurality of the type carriers or perforating elements.

The present invention further contemplates the ready removal of the key inserts or controlling devices and in substitution therefor of other insert devices which control the differential elements in a different manner. Provision is also made for interchanging the controlling slugs or fingers in the inserts so that new names or letters or numeral characters may be substituted therein as desired. Otherwise expressed, my invention contemplates the provision of settable means preferably but not necessarily keys, which, when operated, control the selection of so-called insert or control devices, which devices in turn differentially control the operation of a plurality of perforating or printing elements or both of said elements.

The insert or controlling devices are preferably of such nature that they may be compactly arranged in the machine. Also they may be readily removable therefrom and readily selectable into cooperative position by the manipulation of a key or other equivalent settable means. The controlling devices are also of such form that each and all of them cooperate and control a common set of differential elements, which elements may either control printing or perforating of records, or both printing and perforating.

Hereafter in the claims the term "record effecting" is to be constituted as broadly designating any making of a record either by printing or perforating.

The term "setting devices" is to be constituted as covering key or equivalent controlling means such as a differentially set lever.

While I have herein shown the key insert or slug devices as adapted to control the recording of words or symbols made up of letter characters it will be understood that the insert may also be used for controlling elements which set up numerals or both numerals and letters. In railway tickets printing machines, for example, the key insert could control the printing of both the name of the station and the price of the ticket.

While I have not shown a cash drawer in connection with my device it is obvious that such a device may be used. Being well known in the art no illustration or detailed description thereof is deemed necessary.

Having described my invention what I claim is:

1. In a machine of the class described including printing elements and a plurality of independently operable combination control members for effecting selection of the printing elements for operation in accordance with the combinational operation of the control members, in combination with a plurality of selectively operable slugs for selecting and controlling a combinational operation of the control means, each said slug having a plurality of combinational determining stops and means comprising a keyboard for selecting which of the slugs are to cooperate with and control the combinational operation of the control members.

2. In a machine of the class described in combination, a printing section, and means for controlling said section, said means including a plurality of groups of movable members, each group by its combinational setting being adapted to select a character to be printed, and means for controlling the operation of a plurality of the aforesaid groups of movable control members, said last mentioned means comprising a plurality of slugs each having associated therewith a plurality of combination determining comb stops adapted for cooperation with the control members, and means for selecting which of the aforesaid slugs are to cooperate with the aforesaid control means, said last mentioned means comprising a keyboard and means intermediate the keyboard and said slugs for selecting the same for operation in accordance with the manipulation of the keyboard.

3. In a machine of the class described, means for printing certain data upon a plurality of slips, means for printing other word data only upon one slip, and means for perforating the other slip which does not receive such last mentioned printed word data with character designating designations in the form of perforations which represent such word data which is printed only on the correlated other slip.

4. In a machine of the class described in combination, automatically controlled means for printing predetermined data upon a plurality of sheets, key controlled means for printing additional data upon said sheets, additional means responsive to the actuation of a single key for effecting a controlling set-up of parts which by their setting are representative of the individual component letters of a word or words, and means for variably controlling common elements of printing devices in accordance with the aforesaid set-ups so that common instrumentalities can be employed for printing different words involving like component letter characters upon at least one of the aforesaid sheets.

5. In a machine of the class described, automatically controlled means for printing predetermined data upon a plurality of sheets, key controlled means for printing additional data on said sheets, additional means responsive to the actuation of a single key for effecting a controlling set-up of parts which by their setting are representative of the individual component letter characters of a word or words, perforating devices and means for variably controlling common elements of said perforating devices in accordance with the aforesaid set-up so that common perforating devices can be employed for perforating representations of different words involving like component letter characters upon at least one of the aforesaid sheets.

6. In a machine of the class described, automatic controlled means for printing predetermined data on a plurality of sheets, key controlled means for printing additional data on said sheets, additional means responsive to the actuation of a single key for effecting a controlling set-up of parts which by their setting are representative of the individual component letter characters of a word or words, perforating and printing devices, and means for variably controlling common elements of the printing devices and common elements of the perforating devices in accordance with the aforesaid set-ups so that common printing and perforating devices can be employed for printing or perforating designations of different words involving like component letter characters upon at least one of the aforesaid sheets.

7. In a machine of the class described, in combination, a plurality of sets of type, each set being differentially movable to printing position, means for causing all of said sets to move toward printing position, a controlling keyboard, a plurality of key controlled and selected inserts, each insert being selected by the actuation of a single key, and each insert when so selected being adapted to control the extent of relative differential movement of a plurality of sets of type.

8. In a machine of the class described, a plurality of sets of type, each set being differentially movable to printing position, means for moving said sets to printing position, a combination control device for each of said sets, for controlling the extent of movement thereof, and a member representing a predetermined group of characters for controlling said devices.

9. In a machine of the class described, a plurality of sets of type, each set being differentially movable to printing position, means for moving said sets to printing position, a combination control device for each of said sets for controlling the extent of movement thereof, and means controlled by a single key for controlling all of said devices.

10. In a machine of the class described, a plurality of sets of type, each set being differentially movable to printing position, means for moving said sets to printing position, a combination control device for each of said sets for controlling the extent of movement thereof, means controlled by a single key for controlling all of said devices, and card-perforating means controlled in accordance with the setting of said sets of type.

11. In a machine of the class described, a plurality of sets of type, each differentially movable to printing position, means for moving said sets to printing position, a group of relatively movable members for controlling the extent of movement of each set of type, and a slug having a removable finger for each of said groups of members for controlling the relative movement thereof.

12. In a machine of the class described, a plurality of sets of type, each differentially movable to printing position, a group of relatively movable members for controlling the extent of movement of each set of type, a plurality of normally inoperative slugs, each having a finger for each of said groups of members for controlling the relative movement thereof, and means for selectively bringing said slugs into operation.

13. In a machine of the class described, a plurality of sets of type, each differentially movable to printing position, a group of relatively movable members for controlling the extent of movement of each set of type, a plurality of normally inoperative slugs, each having a removable finger for each of said groups of members for controlling the relative movement thereof, and means for selectively bringing said slugs into operation.

14. In a sales recording machine, in combination with record feeding mechanism, a data keyboard, certain of the keys of said keyboard being representative of items requiring a plurality of characters to designate the same in multiple columns upon a record, means for applying the data set up and selected by the keyboard to printing and perforating means to effect a record, said printing and perforating means having provisions for differently controlling the devices in different multiple columns in accordance with the designation characteristics of a singly depressed key on the keyboard and means for subsequently automatically disposing the printed and perforated record.

15. In a sales recording machine, having a data keyboard, a main operating member, means brought into operation upon the operation of said main operating member for concurrently applying the data previously set up upon the keyboard to a plurality of records, means for automatically advancing individual records from a stack to said last mentioned means, means for advancing other record material from a supply within the machine to said means, and means for directing one record out of the machine and the other coordinated record to a receptacle within the machine.

16. In a sales recording machine in combination, a supply magazine for a stack of separate audit slips, a locked compartment for receiving said separate audit slips after they have been operated upon by the machine, a keyboard, means controlled by said keyboard and brought into operation by and upon the operation of the machine for concurrently applying sales data to a sales slip and to an audit slip, means for feeding the sales slip out of the machine, and means for individually removing audit slips from the storage magazine, advancing them one by one to the data applying means and for thereafter individually advancing the same to said locked compartment.

17. In a sales recording machine, keyboard controlled means for printing and perforating a record, means for automatically feeding a record to said means, a locked compartment, means for automatically feeding a record first to the printing and perforating means and thence to said locked compartment.

18. In a sales recording machine, in combination with a sales slip supply roll, a writing platen over which the sales slip material is adapted to pass to permit the hand writing of records thereon, keyboard controlled means for printing sales data upon the sales slip material, and means for perforating sales data upon an audit card.

19. In a sales recording machine, in combination with means for receiving a sales slip and supporting the same in position to receive a printed record, keyboard controlled means for controlling the printing of records upon the sales slip and for perforating an audit card with correlated records, and means for first effecting the printing operation upon the sales slip and means for subsequently effecting the perforating operation upon the audit card.

20. The invention set forth in claim 19 in which means is provided for printing upon the audit cards data correlated to the perforated records thereof.

21. In a sales recording machine in combination with means for receiving a sales slip in position over a flat writing table to receive hand written records, audit card handling means, keyboard controlled means for perforating sales data on an audit card, a locked receptacle and means for delivering the perforated audit cards to said receptacle.

22. In an accounting machine having provisions for handling a sales slip and a record sheet, means for serially numbering each successive sales slip with a successive serial number by a printed impression thereon, means for serially punching a corresponding serial number upon each corresponding record sheet, and means brought into operation automatically at each operation of the machine for changing said serial number.

23. In an accounting machine, in combination with a controlling keyboard of a sales slip supply roll, means for advancing sales slip material to a record receiving position, a writing table over which the sales slips are adapted to pass to permit written entries to be made thereon, means controlled by said keyboard for effecting the recording of data upon said sales slips and means also controlled by said keyboard for perforating corresponding data upon an audit record.

24. In an accounting machine in combination, means for advancing a sheet of record material, means including a plurality of movable type carriers for recording upon said sheet the complete name of a purchased commodity, said plurality of type carriers comprising individual type carriers adapted for selectively printing any desired constituent component letter character of a word or words in accordance with the differential setting of said individual carrier, all of said carriers by their conjoint relative setting being adapted to print a complete word, key controlled means for controlling the relative differential and individual setting of said type carriers, said means including means for controlling the differential relative setting of a plurality of type carriers from a single key and for otherwise relatively controlling the differential relation of the same type carriers with respect to each other by another single key, and means brought into operation after the setting up of the selected key for effecting the printing of the word under the control of the said key.

25. In an accounting machine, including record-effecting devices for making records, said devices including a plurality of independent differentially movable elements, a plurality of keys for controlling said elements and key insert devices selectively brought into operation by the operation of the keys for co-operatively controlling the displacement of a plurality of said differential devices.

26. In a recording machine having a plurality of controlling keys and a plurality of record effecting elements each of which is relatively movable with respect to other of such elements disposed at the side thereof, in combination with a plurality of devices one for each key and controlled thereby having provisions for controlling the relative displacement with respect to other elements, of a plurality of the aforesaid record effecting elements.

27. The invention set forth in claim 26 in which the devices are removable and separable for the purpose described.

28. In an accounting machine having a controlling keyboard for account designating and amount data, means controlled by said keyboard for recording data upon a sales slip, means for setting up in said machine and maintaining the setting of fixed data such as machine numbers and dates, means controlled by said last-mentioned means for making a record of said set up data upon a sales slip, and means for effecting perforating upon an audit record of the data derived from the keyboard and the set up devices in said machine.

29. In a key-controlled machine, a plurality of type carriers, differential means individual to said type carriers for controlling the setting of the same, a single controlling key, and means intermediate said key and a plurality of said differential means for controlling the individual movements of a group of various differential members to thereby set up upon the type carriers a series of characters indicative of the key which has been depressed.

30. In an accounting machine, in combination with a controlling keyboard, of slip printing mechanism, record perforating mechanism, means controlled by the keyboard for controlling the printing of certain data upon the slip and for perforating certain data upon record material in said perforating mechanism, means for effecting the printing of a plurality of keyboard controlled characters by the sales slip mechanism at one cycle of the operation of the machine, and means operative at a later part of such cycle for effecting the perforating of the corresponding data by the perforating mechanism.

31. In an accounting machine including in combination, a controlling keyboard, a main operating member, slip printing mechanism, record perforating means, means controlled by said keyboard for controlling the operation of said printing and perforating means, means controlled by said main operating means for effecting the printing and perforation of said records, the aforesaid perforating means including instrumentalities for perforating the records with a plurality of perforations which are respectively coordinated in combination, location and number to be adapted to designate any of the individual component letter characters which with other characters may constitute any complete word.

32. In a record-making machine, including a plurality of independent differentially movable elements and a plurality of keys for controlling the same in combination with means intermediate the individual keys and the movable elements for controlling the displacement of the latter, each of said means being common to an individual key and to a plurality of the differential elements for the purpose described.

33. The invention set forth in claim 32 in which the controlling means are individually removable for the purpose described.

34. The invention set forth in claim 32 in which the controlling means are removable as units and in which individual finger-pieces thereof are removable and exchangeable for the purpose described.

35. In an accounting machine, a controlling keyboard, means for feeding audit cards through the machine, and means operable by the depression of a single key for effecting the perforation of said audit card in a plurality of different fields to indicate thereon by said perforations the individual constituent component characters of a designating name or like identifying character which includes a plurality of component characters or numerals.

36. In an accounting machine, a keyboard, means controlled thereby for perforating an audit card, certain of said keys being adapted to control the effecting of perforating in a single field and other single keys of said keyboard being each adapted to control the effecting of perforations in a plurality of coordinated fields.

37. In a recording machine, in combination with setting elements, a plurality of differentially displaceable record-effecting devices, a plurality of controlling devices each controlling device being adapted to differentially control the relative displacement of a plurality of the differentially displaceable record-effecting elements, and means operable by the setting elements for selecting the controlling devices.

38. The invention set forth in claim 37 in which the record-effecting devices include perforating devices.

39. The invention set forth in claim 37 in which the record-effecting devices include printing means.

40. The invention set forth in claim 37 in which the record-effecting devices include both printing and perforating means.

41. In a key-controlled recording machine including, in combination, means controlled by said key for perforating data upon a record sheet, and means controlled by a counter mechanism in said machine which is operated at each operation thereof for effecting the making of perforations upon said record sheet to designate the consecutive numbers of the transactions.

42. In a recording machine having provisions for printing upon one sheet and for perforating another sheet, means in said machine operable at each recording operation for printing upon one sheet the consecutive numbers of the transaction and for perforating the other sheet with corresponding data and means for automatically changing the setting of the consecutive number at each operation of the machine.

43. In a recording machine, in combination, means for printing upon one sheet, correlated means for perforating and printing upon another record sheet, and means for controlling the aforesaid means comprising a counting device operated at each operation of the machine with connections to the aforesaid printing and perforating means whereby consecutive numbers are printed upon one sheet and whereby said numbers are printed and perforated upon the other sheet.

44. In a recording machine, in combination, a plurality of type carriers each provided with individual type representing the letters of the alphabet, a plurality of controlling devices for the aforesaid type carriers, each adapted to control a plurality of carriers and align the letters of a complete word at the printing line, and selecting means for selecting various of said controlling devices whereby different words may be set up depending upon the selected controlling device.

45. In a recording machine having printing devices, perforating devices, means for advancing a plurality of record sheets through the machine, key-controlled means for controlling the printing of data upon both of said sheets and the perforating of certain data upon one of the sheets, and adjustable set up devices for controlling the printing and perforating of fixed data upon the record sheets.

46. In a recording machine having means for handling a plurality of records, means for printing upon one record, means for perforating and printing the other record, and means for controlling said printing and perforating operations comprising key devices for setting up items of individual transactions, adjustable set up devices for controlling repetition data operations, and a counter device for controlling consecutive numbering, printing and perforating operations.

47. In a machine of the class described, having in combination with printing and perforating devices, of settable means for controlling the operations of said devices, a supply receptacle for blank audit records, a locked storage receptacle for completed records, a record sheet supply roll, means for controlling the printing devices to effect printed records on the record material drawn off from said supply roll, means for controlling the perforating devices to effect the making of corresponding perforations upon the audit cards withdrawn from the supply receptacle, and means for delivering said audit cards after the latter have been punched to the locked receptacle.

48. In a machine of the class described, recording elements, means for controlling the operation of said elements, and a combination control member for controlling said means, said member comprising a slug having a plurality of positioning elements for cooperating with said means.

49. In a machine of the class described, automatically controlled means for recording predetermined data on a plurality of slips, key-controlled means for recording additional data on said slips, and additional means responsive to the actuation of a single key for effecting a set-up for recording a representation of a word on at least one of said slips.

50. In a machine of the class described, automatically controlled means for recording predetermined data on a plurality of slips, key-controlled means for recording additional data on said slips, and additional means responsive to the actuation of a single key for effecting a set-up for recording a representation of a word on said slips.

51. In a machine of the class described, a plurality of sets of recording elements, each differentially movable to operative position, means for moving said sets to operative position, a group of relatively movable members for controlling the movement of each set of elements, and a slug for controlling the relative movement of said members, said slug being removable from the machine.

52. In a recording machine including in combination, differentially selectable record effecting instrumentalities adapted for forming various complete word records and the like according to their conjoint selection, controlling means for a plurality of said devices, other control means for said last mentioned control means including a plurality of devices, each of said last mentioned devices constituting a control for a certain combinational group of characters in the ultimate record, and selective means for placing a selected device in controlling relation with said first named control means.

53. A recording machine according to claim 52 wherein the devices which constitute the control means are mounted for removal and replacement by other devices which are representative of different groups of characters in the ultimate record.

54. The recording machine according to claim 52 wherein each device which constitutes one selective control means includes a plurality of elements which are individually replaceable to allow the complete device to represent various records.

55. A recording machine including differentially selectable record effecting instrumentalities adapted to be variously relatively grouped for conjoint recording action to record various multi-character designations, in combination with selecting means therefor and controlling instrumentalities intermediate said selecting means and said record effecting instrumentalities, said controlling instrumentalities having provisions for selectively calling into conjoint action a plurality of record effecting instrumentalities upon the operation of a relatively lesser number of selecting means than that represented by the number of individual component characters in the record designation which is to be effected.

56. The invention set forth in claim 55 in which means is provided for interchanging certain units and parts of the controlling instrumentalities at will for changing the combination of characters which each controlling instrumentality will call for.

57. The invention set forth in claim 55 in which the machine includes a plurality of controlling instrumentality units, each of which is removable for replacement by and with another unit.

58. In a machine of the class described, means for printing certain data upon a plurality of slips, means for printing other data representative of complete words upon one slip only, and means for perforating the other slip which does not receive such last mentioned printed data with designations in the form of perforations which are respectively coordinated and adapted to designate the individual constituent letter characters of the word which is printed upon the other related slip.

In testimony whereof I hereto affix my signature.

JOHN ROYDEN PEIRCE.